(12) United States Patent
Streuter et al.

(10) Patent No.: US 10,241,655 B2
(45) Date of Patent: Mar. 26, 2019

(54) MULTIPLE KEY VALUE ASSIGNMENT SYSTEM

(71) Applicants: Gary Streuter, Laguna Niguel, CA (US); William Pat Price, Henderson, NV (US)

(72) Inventors: Gary Streuter, Laguna Niguel, CA (US); William Pat Price, Henderson, NV (US)

(73) Assignee: Invysta Technology Group, Laguna Niguel, CA (US)

( * ) Notice: Subject to any disclaimer, the term of this patent is extended or adjusted under 35 U.S.C. 154(b) by 621 days.

(21) Appl. No.: 14/954,492

(22) Filed: Nov. 30, 2015

(65) Prior Publication Data
US 2016/0155106 A1    Jun. 2, 2016

Related U.S. Application Data

(60) Provisional application No. 62/086,110, filed on Dec. 1, 2014.

(51) Int. Cl.
| | | |
|---|---|---|
| *G06F 3/023* | (2006.01) | |
| *G06F 3/0484* | (2013.01) | |
| *G06F 3/0489* | (2013.01) | |
| *G06F 3/0488* | (2013.01) | |
| *G06F 21/83* | (2013.01) | |
| *G07F 7/10* | (2006.01) | |

(52) U.S. Cl.
CPC ........ *G06F 3/04842* (2013.01); *G06F 3/0233* (2013.01); *G06F 3/0489* (2013.01); *G06F 3/04883* (2013.01); *G06F 3/04886* (2013.01); *G06F 21/83* (2013.01); *G07F 7/1033* (2013.01); *G06F 3/0238* (2013.01)

(58) Field of Classification Search
CPC ..... G06F 17/24; G06F 3/04842; G06F 3/0238
USPC ......................................................... 345/172
See application file for complete search history.

(56) References Cited

U.S. PATENT DOCUMENTS

| | | | |
|---|---|---|---|
| 6,744,422 B1 * | 6/2004 | Schillings | G06F 3/0233 341/22 |
| 7,788,498 B2 | 8/2010 | Yang et al. | |
| 2010/0115402 A1 * | 5/2010 | Knaven | G06F 3/0237 715/261 |

* cited by examiner

*Primary Examiner* — A. Hunter Wilder
(74) *Attorney, Agent, or Firm* — Law Office of Scott C Harris, Inc (57) ABSTRACT

Multiple letters, characters, numbers, strokes and symbols to be assigned to a given physical key on a physical keypad residing on a physical keypad integrated into, or attached to, an electronic device used for electronic financial transactions such as an Automated Teller Machine (ATM) or Point of Sale (POS) terminal, that is used for data entry on the display screen of an electronic device and the methodology of automatically displaying and inserting the characters assigned to that physical key on the display screen of said electronic device. As the user continues to touch/press said physical key on the electronic devices keypad, the first software module will display and bring into focus the characters assigned to the appropriate time duration of the continued touch/press of said physical key in a visual manner on the display screen of said electronic device and will continue rotating thru the assigned characters as long as the physical key touch/press continues. When the user releases the touch/press of said physical key, the software module will present the character assigned to that time duration to the display software for insertion into the active data entry area shown on the display screen.

4 Claims, 6 Drawing Sheets

MULTIPLE KEY VALUE ASSIGNMENT SYSTEM

This application claims priority from provisional No. 62/086,110, filed Dec. 1, 2014, the entire contents of which are herewith incorporated by reference.

FIELD OF INVENTION

The field of invention relates to keys or buttons residing on a physical keypad integrated into, or attached to, an electronic device used for electronic financial transactions such as an Automated Teller Machine (ATM) or Point of Sale (POS) terminal, and used to provide character input on the display screen of the electronic device.

BACKGROUND

The introduction of devices such as ATM and Point of Sale (POS) electronic devices used in electronic financial transactions requires the users of these devices to physically have possession of their credit/debit cards and to enter identifiable information, most commonly a Personal Identification Number (PIN) or a numeric account address code, such as a zip code, in order to use the electronic device to initiate and complete an electronic financial based transaction. These electronic devices may use a system of physical card swipes of a magnetic strip or embedded chip in the card or may communicate with the card via Near Field Communications (NFC)

With regard to an ATM electronic device, it is connected, via a network, to a collection of massive interbank networks. The two largest interbank networks are Cirrus and Pulse, although there are many others. An ATM electronic device can only provide access to bank accounts that are enrolled in the interbank networks it has access to; these are usually listed on the side of the machine. These interbank networks use phone lines, internet access and central computers to distribute information among one another and facilitate financial transactions.

When the user inserts their debit or credit card into the ATM electronic device, it reads the information encoded on the magnetic strip on the back of the card or in a chip (chip & PIN technology EMV) embedded within the users card. That magnetic strip or the embedded chip may be encoded with a number of key identifiers such as the user's unique card number, and expiration date. The ATM electronic device then asks the user to enter their PIN on the physical keyboard integrated into, or attached to, the ATM electronic device in order to verify the authorization to access account funds and information. When they have verified the PIN, the ATM electronic device communicates with the user's bank to access their account information. The ATM electronic device can then be used to perform a number of electronic financial transactions including display of the users account balance or to distribute cash via the ATM electronic device to the user thus reducing the amount available in the users account. Per a report authored by Trends Today, there are 2,200,000 ATM electronic devices in use world-wide as of 2012.

Point of Sale electronic devices involve hardware and software used primarily by retailers to accept payment transactions from their customers. Retailers are the most common end users of POS systems. When a customer swipes their debit or credit card through the POS terminal, the transaction begins with the card reader extracting the Bank Identification Number (BIN) from the cards magnetic tape strip or from its embedded chip. The BIN identifies the type of card, debit or credit, as well as the issuing organization (VISA, MasterCard, American Express, etc.). The POS system then, based on the BIN, determines the network that should be accessed, the communications link for that network, and other operational parameters required to complete the transaction as quickly and securely as possible. These parameters include the data transfer rate, the line protocol, either synchronous or asynchronous, and the type of encryption and the encryption key to use. Like the ATM electronic Device, the POS electronic device then asks the user to enter their PIN or numeric account address code, such as a zip code, on the physical keyboard integrated into, or attached to, the POS electronic device in order to verify the authorization to access account funds and information. When the code entered has been verified, the POS electronic device communicates with the user's bank to access their account information. The POS electronic device can then be used to perform a number of electronic financial transactions including display of the users account balance or to distribute cash via the ATM electronic device to the user, thus reducing the amount available in the users account. Per a report by GAO Research, there are over 10,000,000 POS electronic devices in use in the USA alone and that over 28 billion transactions are conducted on these electronic devices each year.

As indicated above, the scope of penetration of ATM & POS electronic devices is huge and growing. Users today depend on this technology in their everyday life. But this dependence does not come without risk. Identity theft has become rampant today and losses are measured in the billions of dollars world-wide. It is also a very frustrating experience for users who have been compromised. Thus, new security measures, which reduce the possibility of their personal data being compromised, are highly attractive to these users. It is this user security which is being addressed in this disclosure. There is a common denominator present for all of the electronic financial transactions described above and that is the requirement that the card user input an identification number that confirms their authorization to use that account. If that identification number is compromised, an important element of the user's security umbrella has disappeared. This holds true regardless of the type of card used—debit or credit card. Or the card technology that provides the users information—magnetic strip or chip. Or the platform used for the electronic financial transaction—ATM/POS. Or the system and method used of presenting the personal data to the electronic device—card swipe or NFC (Near Field Communications). In all of these cases, the user is asked to enter a personal identifier that is often as simple as 4 numeric digits of a PIN or 5 numeric digits of a zip code.

This disclosure defines a system and method that increases the pool of characters available for inclusion in the personal identifier as well as increasing the physical security of the entry process on the keypad of the electronic device.

SUMMARY

The inventors recognized that what is needed is a system and method of improving the security of the data entry process on electronic devices used for electronic financial transactions such as ATM or Point of Sale devices.

Merchants in the United States are losing approximately $190 billion a year to credit card fraud according to a 2009 Lexis Nexis study. Because the fraud losses are distributed across all merchants in the USA the consumer does not hear too much about them—although we do hear about the bank's pain. For the banks and credit card companies fraud is a big problem but for the rest of us it is actuality a huge problem—as these loses are passed on to the consumer one way or another, as increased fees or higher prices for products among other methods. The shortcomings of relying on the current system and method of inputting user identity codes for financial transactions on ATM/POS electronic devices is inadequate in providing the level of security that a user should be reasonably able to expect.

DETAILED DESCRIPTION OF THE INVENTION

Reference will now be made in detail to various embodiments, examples of which are illustrated in the accompanying drawings. Wherever possible, the same reference numbers will be used throughout the drawings to refer to the same or like parts.

Definitions

ATM electronic device: An electronic banking outlet, which allows customers to complete basic transactions without the aid of a branch representative or teller.

Continued press of said physical key: The measurement of elapsed time of the continued touch/press of said physical key.

Credit Card: A typical plastic card issued by a financial institution that allows its user to borrow pre-approved funds.

Data: This represents the common and uncommon representations of letters, characters, numbers, strokes, symbols, and URLs used to communicate and can support multiple language sets, as well as scientific notation.

Data assigned to said physical key: This represents the letters, characters, numbers, strokes, symbols, and URLs that have been assigned from a plurality of arrays, for use by an individual physical key on the keyboard or keypad of a ATM/POS electronic device.

Data Character: Any one of the letters, characters, numbers, strokes, symbols, or URLs defined in the above definitions.

Debit Card: An electronic card issued by a bank which allows bank clients access to their account to withdraw cash or pay for goods and services Designated data entry area on the display screen of an electronic device—A data entry location displayed on the display screen of an ATM/POS electronic device Duration of Time: The elapsed time during which Data assigned in sequence to a physical key is in focus.

Display Screen of an Electronic Device: A display screen for presenting DATA from an electronic device to a user Electronic Device: A device which contains a microprocessor and memory with computational capabilities.

Electronic Financial Transaction: A transaction that involves the payment for goods and/or services or access to financial account information that is accomplished electronically.

In Focus: The letter, character, number, stroke, symbol or URL that is currently at the top of the priority stack to be inserted into the designated data entry area of the display screen of the electronic device.

Near Field Communications (NFC): A short range wireless RFID technology that makes use of interacting electromagnetic radio fields instead of the typical direct radio transmissions used by technologies such as Bluetooth.

Order of Sequence: The order of assignment of letters, characters, numbers, strokes, symbols and URLs to said physical key in a hierarchical manner.

Physical Keypad—A collection of physical data input buttons embedded within, or attached to, an electronic device Physical Keyboard—Used interchangeably with Physical Keypad POS electronic device: A type of electronic-transaction terminal that acts as a computerized replacement for a cash register Rotary Effect: The circular repetition of Data assigned to a physical key, once the total time duration assigned to said physical key has been completed and the touch/press of said physical key continues.

Termination of the touch/press of said physical key: The release by the user of the continued touch/press of said physical key.

Objects and advantages of the present invention will become apparent to those skilled in the art upon reading this description in conjunction with the accompanying drawings, in which like reference numerals have been used to designate like or analogous elements.

Figure 1:
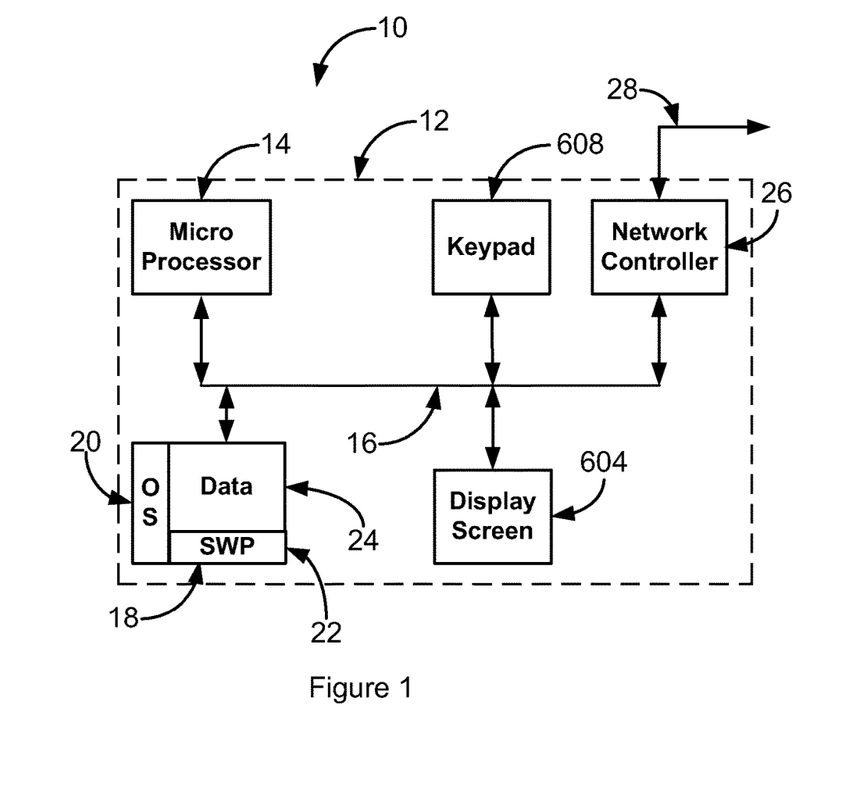
FIG. 1 is a simplified schematic of the electronics in an ATM or POS device.

Now referencing FIG. 1 where 10 is a simplified depiction of the electronics in an ATM or POS device. ATM/POS device 12 contains system bus 16. System bus 16 provides an electronic path between all of the electronic subassemblies contained in ATM/POS device 12. Microprocessor 14 executes (OS) operating system 20 and (SWP) software program 22 contained in system memory module 18. System memory module 18 also contains data 24 while typically contains the data character arrays depicted in FIGS. 2, 3, and 4. Display screen 604 has a data entry area 606 shown in FIG. 6. Keypad 608, also depicted as zoomed view 610 shown in FIGS. 5 and 6, and network controller 26 also connected to network 28. In the present figure, software program 22 will receive inputs from keypad 608 and display data characters on display screen 604 in data entry area 606 (not shown). When the user enters a request or a PIN using keypad 608, software program 22 will, after the last data character for the PIN has been entered, send the just entered PIN to a server (not shown) residing on network 28 via network controller 26. The server will respond to the PIN by sending a display page (not shown) to ATM/POS device 12 which will display the display page on display screen 604.

Figure 2:
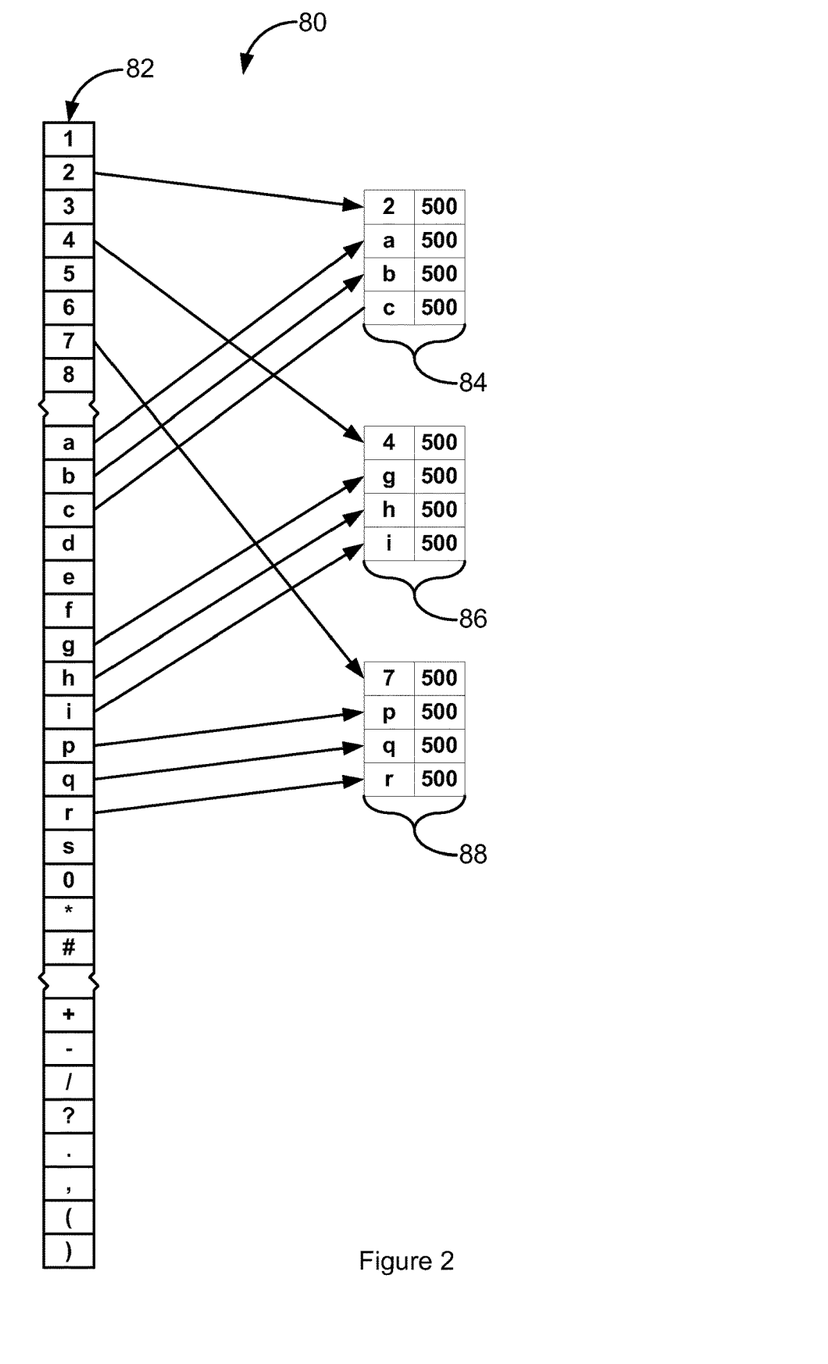
FIG. 2 is a is a depiction of an array of displayable data characters and smaller arrays which contain data characters assigned from the larger array of data characters.

Now referencing FIG. 2 where 80 depicts displayable data character array 82 and smaller arrays assigned to specific keys of keypad 608. For the sake of clarity, only the arrays for three keys ("2", "4", and "7" are shown. Note that each key array contains two columns where the first column contains a sequence of data characters and the second column contains a series of numbers which represent, in milliseconds, the amount of time the data character in the adjacent data character column will remain on display screen 604 and inside data entry area 202 before the next data character in the data character array will be displayed. Note that keypad array 84 for key "2" contains four data characters these being "2", "a", "b", and "c". Keypad array 86 for key "4" contains four data characters these being "4", "g", "h", and "i". Keypad array 84 for key "7" contains four data characters these being "7", "p", "q", and "r". When ATM/POS device 12 is booted, software program 22 assigns data characters from data character array 82 to the array assigned to each key resident in keypad 608 and assigns the number of milliseconds each data character will remain on the display if the user does not release the key that is currently being pressed.

Figure 3:
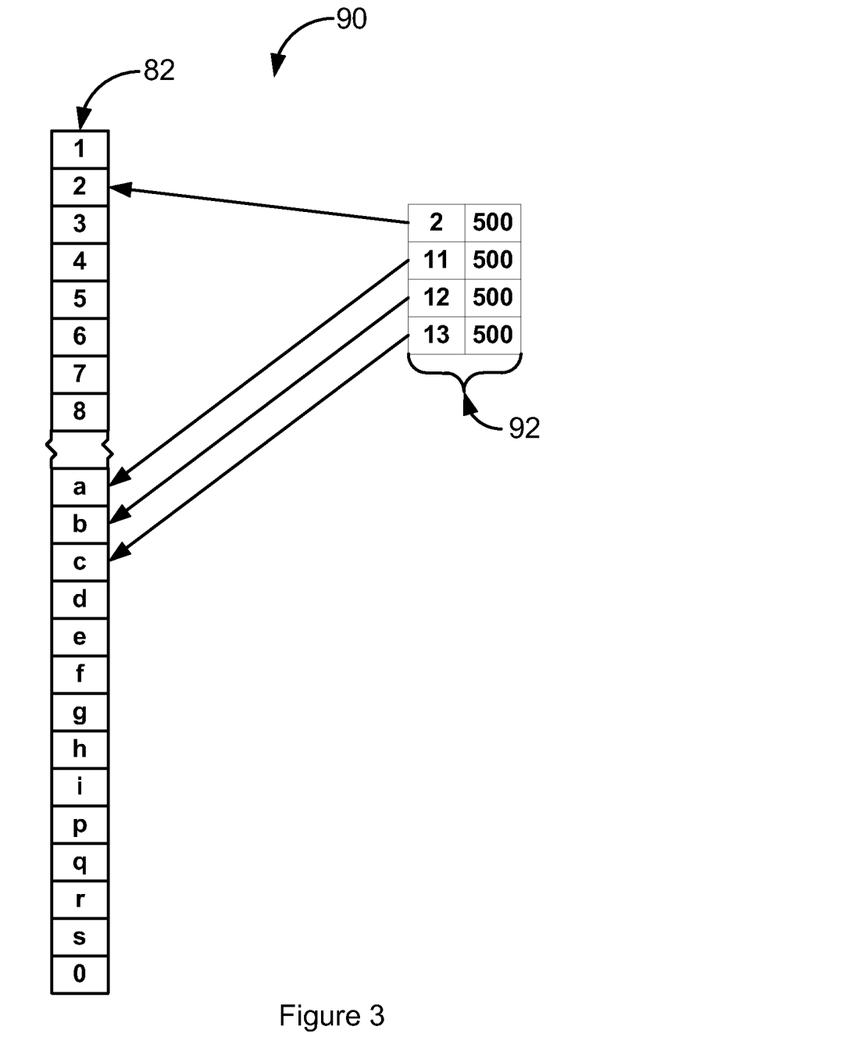
FIG. 3 is a depiction of an array of displayable data characters and smaller arrays assigned to each key of the keypad where an index into the larger array replaces the actual displayable data character.

Now referencing FIG. 3 where 90 depicts displayable data character array 82 and one of a plurality of smaller arrays assigned to specific keys of keypad 608. For the sake of clarity, only the array for one key is shown, that being the "2" key. Note that this key array contains two columns where the first column contains an index to each of a sequence of data characters "2", "a", "b", and "c". The second column contains a series of numbers which represent in milliseconds the amount of time the data character pointed to by the index in the adjacent data character column will remain on display screen 604 and inside of data entry area 202 before the next data character in the data character array will be displayed. Data character array 82 contains the same data in both FIGS. 3 and 4 while key array 84 contains the actual sequential data characters and key array 92 contains an index back to individual data characters in data character array 82.

Figure 4:
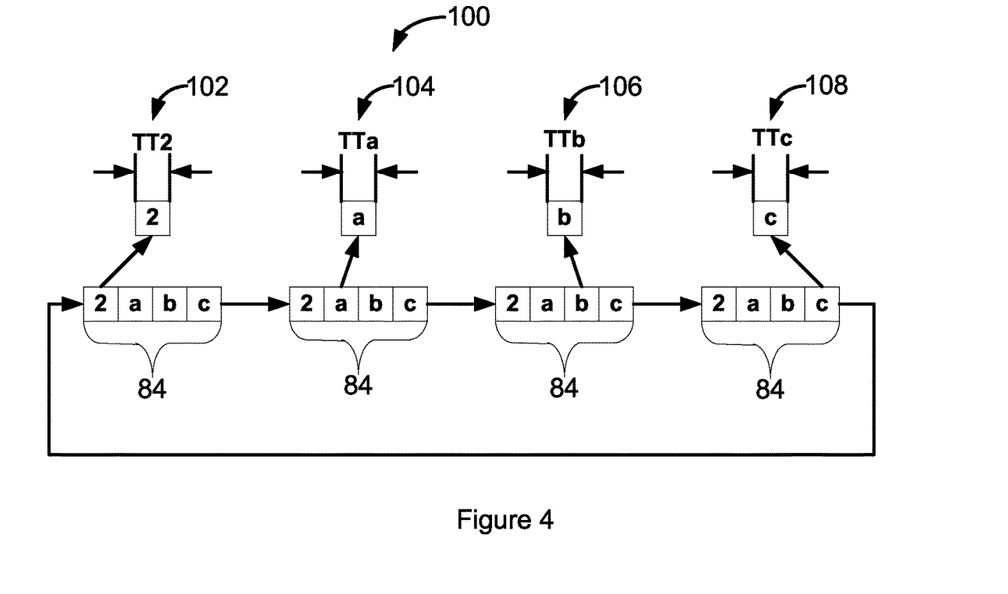
FIG. 4 is a depiction of one array of assigned data characters assigned to a single key residing in the keypad and how the character in focus changes once a user presses and does not release the corresponding key.

Now referencing FIG. 4 where 100 depicts data character 84 which contains displayable characters "2", "a", "b", and "c". When a user presses the "2" key residing on keypad 608 and depicted in greater detail in zoomed view 610, ATM/POS device 12, under control of software program 22, the computer ATM/POS will receive data character "2" from keypad 608 and in turn will send data character "2" to display device 602 data entry area 202 which will display data character ("2"). If the user continues to press the "2" key, time TT2 (102) will expire and ATM/POS device 12 will then display a "backspace" data character overwriting the current data character "2" at the current position of cursor 206 after which ATM/POS device 12 will then display the next data character in sequence, which in this depiction, will be the "a" data character which will be displayed at the current cursor position. If the user does not release the pressed key, software program 22 will continue, every time the timer value (TT2, TTa, TTb, and TTc) associated with its displayable data character expires, overwrite a blank space followed by the next sequential data character to be displayed at the current position of cursor 206. Once data character "c" is displayed and its associated timer value TTc expires, software program 21 will overwrite the data character with a blank space followed by the first sequential data character in data key array 84 which in this case is the data character "2". This loop action will continue until the user releases the key "2" and whichever displayable data character is currently being displayed will remain in data input area 202 at the current position of cursor 206 prior to cursor 206 being advanced by software program 22 to the next character position.

Figure 5:
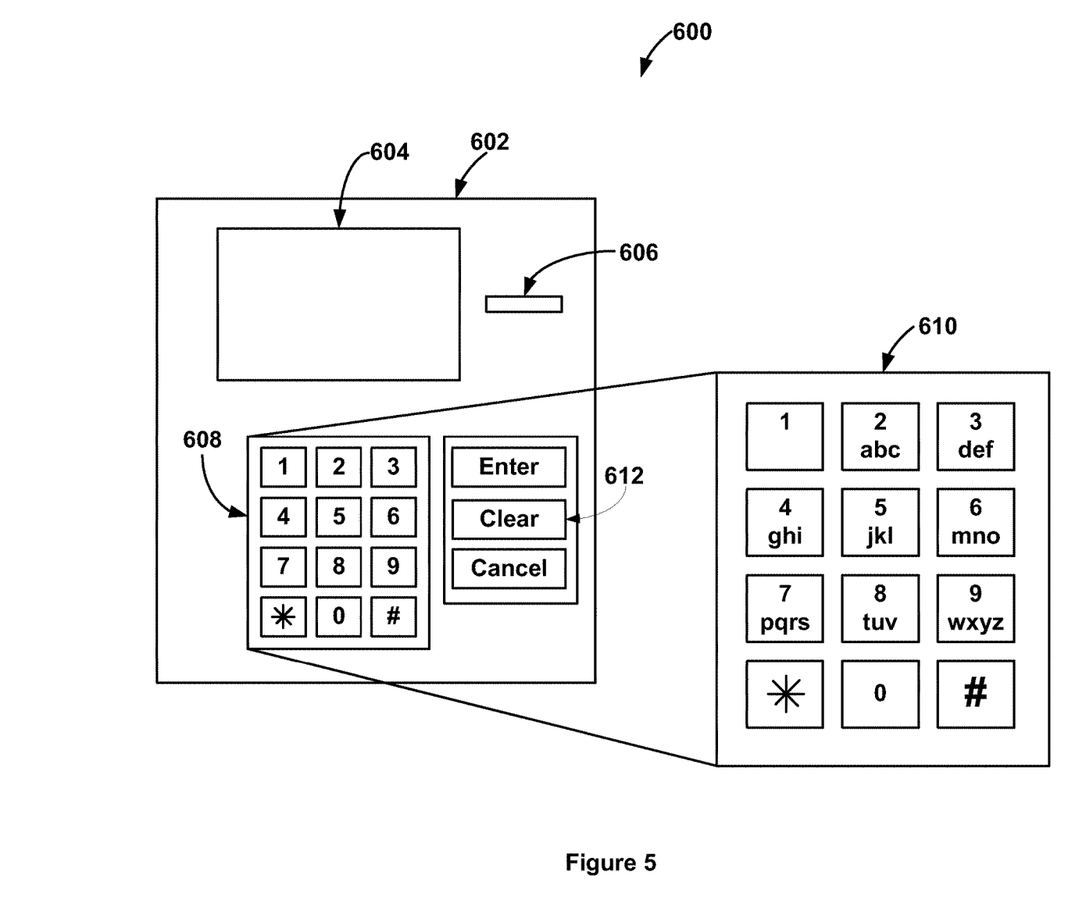
FIG. 5 is a depiction of the front of an ATM machine showing the display screen, card entry slot, keyboard, control keys and a zoomed view of the keyboard.

Now referencing FIG. 5 where 600 depicts a front view of ATM machine 602. In this depiction, display screen 604 is shown with card input slot 606, physical keypad 608 with zoomed view 610 showing greater detail of keypad 608, and control buttons 612. In this depiction, a user would insert their credit card or debit card (not shown) into card input slot 606. Display screen 604 then, after the account number has been read from the inserted credit or debit card, displays a prompt for the user to enter his PIN number. The user would enter their PIN number by pressing a series of keys on keypad 608. When the user presses the last key for their PIN number, he would press the "Enter" key contained in control keys 612. Upon detection of the Enter key being pressed, ATM 602 transfers the user's account number and PIN number to a server residing on network 28 and communicably coupled to ATM machine 602. The server will authenticate the user's credit card or debt card along with the user entered PIN number and return a display page (not shown) that will be displayed on display screen 604. Typically, the display page returned by the server provides a plurality of options from which the user will select one option for services.

Figure 6:
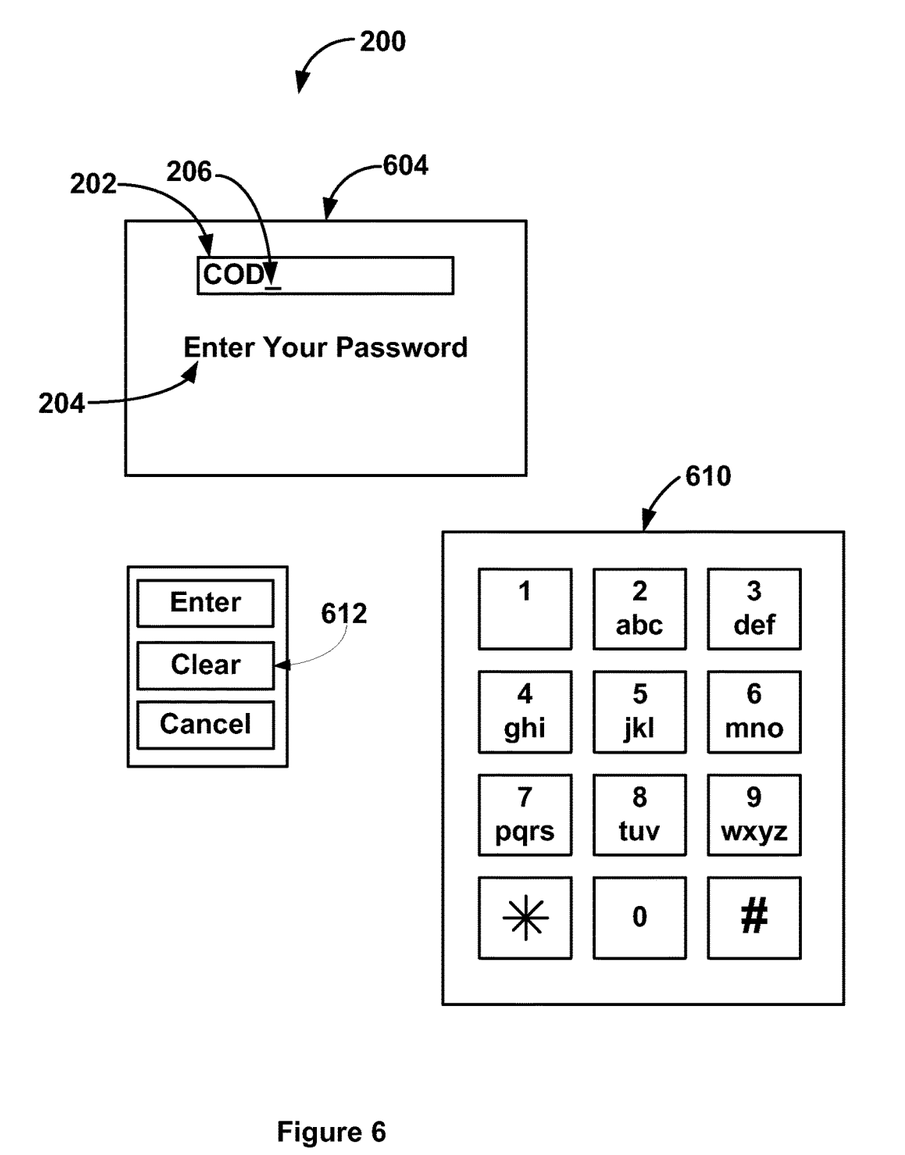
FIG. 6 is a depiction of the display screen with the data entry window showing three data characters entered via the keyboard.

Now referencing FIG. 6 where 200 depicts several components of ATM 602. These components are display screen 604, data input area 202, control keys 612, and zoomed view 610 of keypad 608. For the purposes of this discussion, zoomed view 610 will be referenced instead of keypad 608. In this depiction, the user, after inserting their credit card or debit card in slot 608 is prompted by displayed message 204 "Enter Your Password". PIN numbers on ATM and POS terminals are generally thought of as four digit numbers. ATM and POS terminals though typically will have the letters of the alphabet shown just below the number for any given key. While often a mystery to the average ATM or POS user, the letters are provided because some people can remember four letter words better than four digit numbers. For example, the word "coda" is a term used in music. Its numerical equivalent on an ATM keyboard is 2-6-3-2. The word "coda" is probably easier for a musician to remember than the number sequence. The problem however for security is that "coda" is still 2-6-3-2. There are persons who will look over a user's shoulder and watch users enter their PIN codes into a keypad for the purpose of being able to gain access to the user's accounts if they can steal the user's ATM card. While four key presses on the illustrated zoomed view 610, assuming keys 2-9 are being pressed, can represent 256 combinations of numbers and letters but the letters are illusional and only the numbers on the four keys are needed for gaining access to the user's account. The present invention however adds the element of time delays for actually selecting letters as well as numbers for an account identifier. For example, assuming that any four keys of zoomed view 610 are pressed and held for some amount of time, the total combination of numbers and letters is truly 256 unique combinations. If the number keys 2-9 are considered then there are a total of some 255 unique combinations of letters and numbers possible across any 4 keys out of a total possible 65,638 total combinations. Using the PIN of "coda" the user would first press the "2" key. The number/letters that can possibly display is "2"-"a"-"b"-"c". In this scenario, the user presses the "2" key and releases it when the letter "c" appears. If the user continues to hold the "2" key down the sequence will repeat until he releases the key. The second key he will then press is the "6" key which will display the sequence of "6"-"m"-"n"-"o". The user will release the key when the "o" is displayed. The third key he will then press is the "3" key which will display the sequence of "3"-"d"-

"e"-"f". The user will release the key when the "d" is display. The fourth key he will then press is the "2" key which will display the sequence of "2"-"a"-"b"-"c". The user will release the key when the "a" is displayed. The may choose to only use one letter in a four data character PIN or any combination of numbers and letters. The point here is that someone watching the user enter a PIN being controlled by the present invention is only going to be able to determine the physical keys being pressed and not the actual character/number being entered. The ability of the ATM/POS terminal to accept both number and letters for a PIN greatly enhances the security of the user's PIN.

The advantage of the present invention over other security schemes such as the use of chips in cards is that (1) it is compatible with chip in card schemes and (2) it is easy for ATM/POS providers to implement. The present invention, assuming the physical keys on the ATM/POS contain letters in addition to numbers, can be implemented in firmware only. The present invention does not require hardware changes or additions.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media. The computer readable media can be an article comprising machine-readable non-transitory tangible medium embodying information indicative of instructions that when performed by one or more machines result in computer implemented operations comprising the actions described throughout this specification.

Operations as described herein can be carried out on or over a website. The website can be operated on a server, computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system of receiving data on an electronic device, comprising:
   a display screen on said electronic device,
   a physical keypad having physical keys for entry of data, and
   a processor executing a first software program that assigns data characters and attributes to a key on said keypad,
   wherein said first software program assigns said physical key on said electronic device a plurality of data characters and in a specific order of sequence from a plurality of arrays and said first software program also assigns to each data character, from said plurality of arrays, a defined sequential durations of elapsed time within the continued touch/press of any of said physical keys,
   wherein said first software program also measures the continuous time a user activates any said physical key by a continued touch/press of said physical key on the physical keypad residing on said electronic device and said first software program also brings into focus in a designated data input area on said display screen, the data character assigned to said physical key based on its assigned specific order of sequence and its assigned sequential duration of time within the total elapsed time the user continually touched or pressed said physical key on said electronic device and said first software program causes the insertion into a designated data entry area of said display screen of said data character that is in focus at the time the continuous touch or press of said physical key is terminated by the user and if the user has not terminated the continuous touch or press of said physical key within said total elapsed times of all the data characters assigned to said physical key, said first software program brings into focus in side designated data input area on said display screen in a rotary order, said first data character defined in the specified set of data characters assigned to said physical key and continues to rotor through said assigned data characters until the continuous touch or press of said physical key is terminated by the user, causing the insertion of said data character currently in focus to be inserted into said designated data entry area of said display screen, and
   wherein a selection of a first data character assigned by said first software program to said individual physical key on said electronic device is presented on said display screen of said electronic device and is determined by the elapsed time of said continued press of said physical key, and after a first assigned sequential duration of time associated with the first data character has passed, said first software program sends a backspace to said display screen, and then sends a second sequential character assigned to said physical key into focus and resets the sequential duration of time to a second assigned sequential duration of time associated with the second sequential character which is different from the first assigned sequential duration of time associated with the first data character.

2. The system as in claim 1, wherein said display screen is used for various applications such financial transactions on said electronic device.

3. The system of claim 1 whereby the data characters assigned to said physical keys will be visually displayed on each key of said physical keypad in a manner which denotes to the user the specific order of sequence in which said data characters were assigned to said key and where the representation of the data character may be based on the position on the key or any other visual representation or overlay that indicates to the user the specific order of sequence associated with that data character.

4. A method controlled by a first software program for displaying in a designate data entry area on a display device, a plurality of data characters assigned to an individual physical key on a physical keypad residing on an electronic device used for financial transactions comprising:
   a. assigning said individual physical key on said electronic device the plurality of data characters in specific order of sequence from a plurality of arrays;
   b. assigning to each data character of the plurality of data characters a defined sequential duration of elapsed time within the continued press of said individual physical key, wherein each said data character of the plurality of data characters assigned to said individual physical key embedded within or attached to said electronic device is assigned a sequenced duration of time within the continued press of said physical key and said duration of time of said continued press determines the selection of focus of said data character assigned to said key, and after each elapsed time, said first software program sends a backspace to said display screen, and then sends a new character to said physical key;
   c. measuring the continuous time a user activates said individual physical key by a continued press of said physical key;
   d. bringing into focus in the designated data entry area on said display device a first data character assigned to said initially touched or pressed key based on an assigned specific order of sequence and a first assigned defined sequential duration of time within the total elapsed time the user continually touched or pressed the key;
   e. bringing into focus in the designated data entry area on said device a second sequential character assigned to said pressed key after a first assigned defined sequential duration of time associated with the first data character has passed, and resetting the sequential duration of time to a second assigned defined sequential duration of time associated with the second sequential character which is different from the first assigned sequential duration of time associated with the first data character;

f. inserting into said designated data entry area on said display device of the data character that is in focus at the time said continuous touch or key press is terminated; and g. if the user has not terminated said continuous touch or press of said key within said total elapsed total time of all said data characters assigned to said key, said first software program acts in a rotary effect and bring into focus on said display device, said first data character defined in said specified set of data characters assigned to said key and shall continue to rotor through said assigned data characters until said continuous touch or press of said key is terminated by the user, causing the insertion of the data character currently in focus to be inserted into the designated data entry area of said display device.

* * * * *